United States Patent
Ishiguro et al.

(10) Patent No.: US 6,810,835 B2
(45) Date of Patent: Nov. 2, 2004

(54) MOISTURE SEPARATOR, AND VAPOR GENERATOR

(75) Inventors: Tatsuo Ishiguro, Hyogo (JP); Yoshiyuki Kondo, Hyogo (JP); Yasuhiko Hirao, Hyogo (JP); Hiroshi Hirano, Hyogo (JP); Toshiyuki Mizutani, Hyogo (JP); Tomoyuki Inoue, Hyogo (JP); Kaori Nagai, Hyogo (JP); Junichiro Kodama, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/470,778

(22) PCT Filed: Nov. 5, 2002

(86) PCT No.: PCT/JP02/11529

§ 371 (c)(1),
(2), (4) Date: Jul. 31, 2003

(87) PCT Pub. No.: WO03/039715

PCT Pub. Date: May 15, 2003

(65) Prior Publication Data

US 2004/0069243 A1 Apr. 15, 2004

(30) Foreign Application Priority Data

Nov. 6, 2001 (JP) .................................. 2001-340982

(51) Int. Cl.$^7$ .............................................. B01D 45/00
(52) U.S. Cl. ........................................ 122/34; 55/444
(58) Field of Search ......................... 122/34, 4 D, 488, 122/491, 489; 55/444; 429/26, 30, 34, 39

(56) References Cited

U.S. PATENT DOCUMENTS

| 1,351,433 A | * | 8/1920 | Nelis ............................ 122/491 |
| 1,678,844 A | * | 7/1928 | Bradshaw ..................... 55/444 |
| 4,016,835 A | * | 4/1977 | Yarden et al. ............... 122/483 |

FOREIGN PATENT DOCUMENTS

| JP | 48-95663 | 12/1973 |
| JP | 50-76659 | 6/1975 |

* cited by examiner

Primary Examiner—Gregory Wilson
(74) Attorney, Agent, or Firm—Oblon, Spivak, McClelland, Maier & Neustadt, P.C.

(57) ABSTRACT

A moisture separator 100 includes a plurality of flat frame plates 102 disposed parallel to each other to define a plurality of zigzag passages 101 between the frame plates 102, side walls facing the upstream side of the passages 101 defining entrance openings 120a and 122a of droplet collecting pockets 120 and 122.

11 Claims, 5 Drawing Sheets

MOISTURE SEPARATOR, AND VAPOR GENERATOR

FIELD OF THE INVENTION

The invention relates to a steam generator used in a steam generator of a pressurized water nuclear plant.

BACKGROUND ART

In a pressurized water nuclear power generating plant a reactor core which is disposed within a reactor nuclear vessel is cooled by primary cooling water. The primary cooling water, heated by the nuclear energy emitted from the reactor core, is introduced into a steam generator. Within the steam generator, the heat is transferred to secondary cooling water to boil the secondary cooling water. The steam thus generated drives a steam turbine to generate electric power. The steam generated within the steam generator is introduce into a steam separating device, disposed in upper inside volume of the steam generator, for removing the water contained in the steam flow. The steam separating device generally comprises centrifugal steam separators disposed at the upstream side relative to the steam flow and a frame plate type moisture separator disposed at the downstream of the centrifugal steam separators.

FIG. 5 shows an example of the conventional frame plate type moisture separator.

In FIG. 5, a moisture separator 10 comprises a plurality of frame plates 12. A plurality of zigzag passages 11 are defined between the frame plates 12. Each of the frame plates 12 for defining the passages 11 includes a plurality of droplets collecting pockets 14 disposed side wall portions 12a extending from roots 16, which swell outwardly relative to the zigzag passage 11, toward apexes 18 which swell inwardly relative to the passage 11. The steam including droplets W is supplied into the passages 11 through the left ends, in FIG. 4, and discharged through the right ends after the droplets W are trapped and removed into the pockets 14.

Recently, reduction in moisture at the outlet of the steam generator is required. However, there is a problem that the conventional moisture separator 10 cannot reduce the degree of wetness sufficiently. That is, the conventional moisture separator 10 has a problem that the droplets collecting pockets disposed at the upstream sides in the passages 11 can collect relatively large droplets W, however, so called carry over occurs so that the droplets that were once trapped by the pockets 14 fly out of the pockets into the stream flow in the passage 11 or the relatively small droplets W cannot be trapped sufficiently by the pockets 14 disposed at the downstream side in the passage 11.

SUMMARY OF THE INVENTION

The invention is directed to solve the above described problems of the prior art and to provide a moisture separator improved to increase the droplets collection performance.

Further, the objective of the invention is to provide a moisture separator which reduces its production cost.

Further, the objective of the invention is to provide a moisture separator which can collect relatively small droplets.

According to the invention, there is provided a moisture separator comprising a plurality of flat frame plates disposed parallel to each other to define a plurality of zigzag passages between the frame plates, side walls facing the upstream side of the passages defining entrance openings of droplet collecting pockets.

The production cost is remarkably reduced compared with moisture separators according to the prior art by using flat frame pieces.

According to the invention, there is provided a moisture separator with a plurality of frame plates disposed parallel to each other to define a plurality of zigzag passages, wherein the frame plates comprise flat plate members; the moisture separator comprising droplet collecting pockets having entrance openings disposed in side wall portions of the zigzag passages between, seeing from the upstream side of the passages, roots swelling outwardly relative to the passage and apexes swelling inwardly relative to the passage; and the droplet collecting pocket including first droplet collecting pockets, disposed at the upstream side of the passages, for collecting relatively large droplets, and second droplet collecting pockets, disposed at the downstream side of the passages, for collecting relatively small droplets.

When the steam flows through the zigzag passages, the droplets contained in the steam impinge against the side walls of the passages. At that time, a portion of the droplets enters the droplet collecting pockets and are trapped in the pockets. At the upstream side of the passages, relatively large droplets are collected because large droplets are easily trapped. Therefore, the first droplet collecting pockets for collecting relatively large droplets are disposed at the upstream sections of the passages. On the other hand, in the downstream sections of the passages, relatively small droplets stay still in the steam flow after the large droplets are trapped. Therefore, the second droplet collecting pockets for collecting relatively small droplets are disposed at the downstream sections of the passages. Hence, the droplet collection efficiency in particular the collection efficiency for the small droplets can be remarkably increased by the arrangement of the first droplet collecting pockets for collecting relatively large droplets disposed at the upstream sections and the second droplet collecting pockets for collecting relatively small droplets disposed at the downstream sections of the passages.

The entrance openings of the first droplet collecting pockets are preferably disposed apart from the apexes in the side wall portions between the roots swelling outwardly relative to the passage and the apexes swelling inwardly relative to the passage, and the entrance openings of the second droplet collecting pockets are preferably disposed adjacent the apexes in the side wall portions between the roots swelling outwardly relative to the passage and the apexes swelling inwardly relative to the passage.

Means for agglomerating droplets may be disposed between the first and second droplet collecting pockets. The means for agglomerating droplets may comprise a coil member disposed to across the passage.

Further, according to another feature of the invention, there is provided a moisture separator with a plurality of frame plates disposed parallel to each other to define a plurality of zigzag passages, wherein the frame plates comprise flat plate members; the moisture separator comprising a plurality of droplet collecting pockets having entrance openings disposed in side wall portions of the zigzag passages between, seeing from the upstream side of the passages, roots swelling outwardly relative to the passage and apexes swelling inwardly relative to the passage; and the entrance openings of all the droplet collecting pocket being disposed adjacent the apexes in the side wall portions between the roots swelling outwardly relative to the passage and the apexes swelling inwardly relative to the passage.

Furthermore, according to another feature of the invention, there is provided a moisture separator with a plurality of frame plates disposed parallel to each other and a plurality of arcuate sections attached to the frame plates to define a plurality of serpentine passages, wherein the frame plates comprise flat plate members; and the moisture separator comprising a plurality of droplet collecting pockets having entrance openings disposed in side wall portions of the serpentine passages between, seeing from the upstream side of the passages, roots swelling outwardly relative to the passage and apexes swelling inwardly relative to the passage.

Furthermore, according to another feature of the invention, a steam generator which comprises one of the above-described moisture separator, an inversed U-shaped tube bundle which uses the primary cooling water from a nuclear reactor as a heating medium and a plurality of steam separators. Steam containing less moisture can be generated by a steam generator with the above-described moisture separator so as to effectively prevent erosion at a turbine unit of a turbine generator.

THE MOST PREFERRED EMBODIMENT

With reference to the attached drawings, a preferred embodiment of the invention will be described below.

Figure 3:
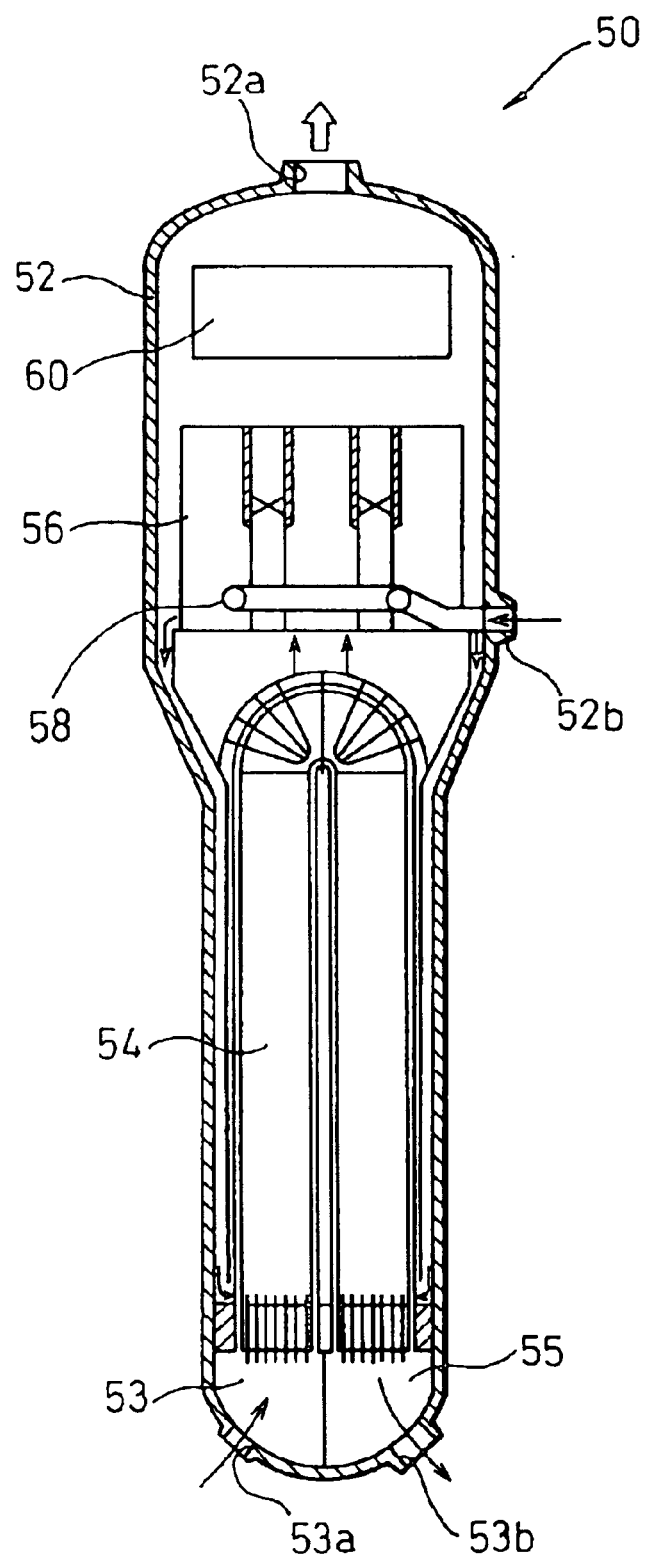
FIG. 3 is a partially broken perspective view of a moisture separator.

With reference to FIG. 3, an example of the steam generator using a moisture separator according to the invention is shown. The steam generator 50 includes a tube bundle 54 which is disposed at the lower part of the inside volume of a pressure vessel 52 and immersed in the secondary cooling water. The tube bundle 54 is formed into inverted U-shape, one end thereof being fluidly connected to a primary water entrance chamber 53 and the other end being fluidly connected to a primary water outlet chamber 55. A plurality of centrifugal steam separators 56 are disposed at the upper part of the inside volume of the pressure vessel 52 above the tube bundle 54, in particular above the surface of the secondary water contained in the pressure vessel 52. A moisture separator 60 is disposed above the centrifugal steam separators 56 to which the present invention is applied.

The high temperature primary cooling water, which has cooled the reactor core in the nuclear reactor, is supplied to the primary cooling water entrance chamber 53. The primary cooling water flows from the primary cooling water entrance chamber 53 to the primary cooling water outlet chamber 55 through the tube bundle 54. On the other hand, the secondary cooling water is directed to the periphery of the tube bundle 54 in the pressure vessel 52 through a secondary cooling water inlet port 52b, provided in the pressure vessel 52, and a feed water ring 58. During the primary cooling water flows through the tube bundle 54, the secondary cooling water contained in the pressure vessel 52 is heated through the heat exchange with the primary cooling water. Thus, the steam of the secondary cooling water is generated.

Figure 4:
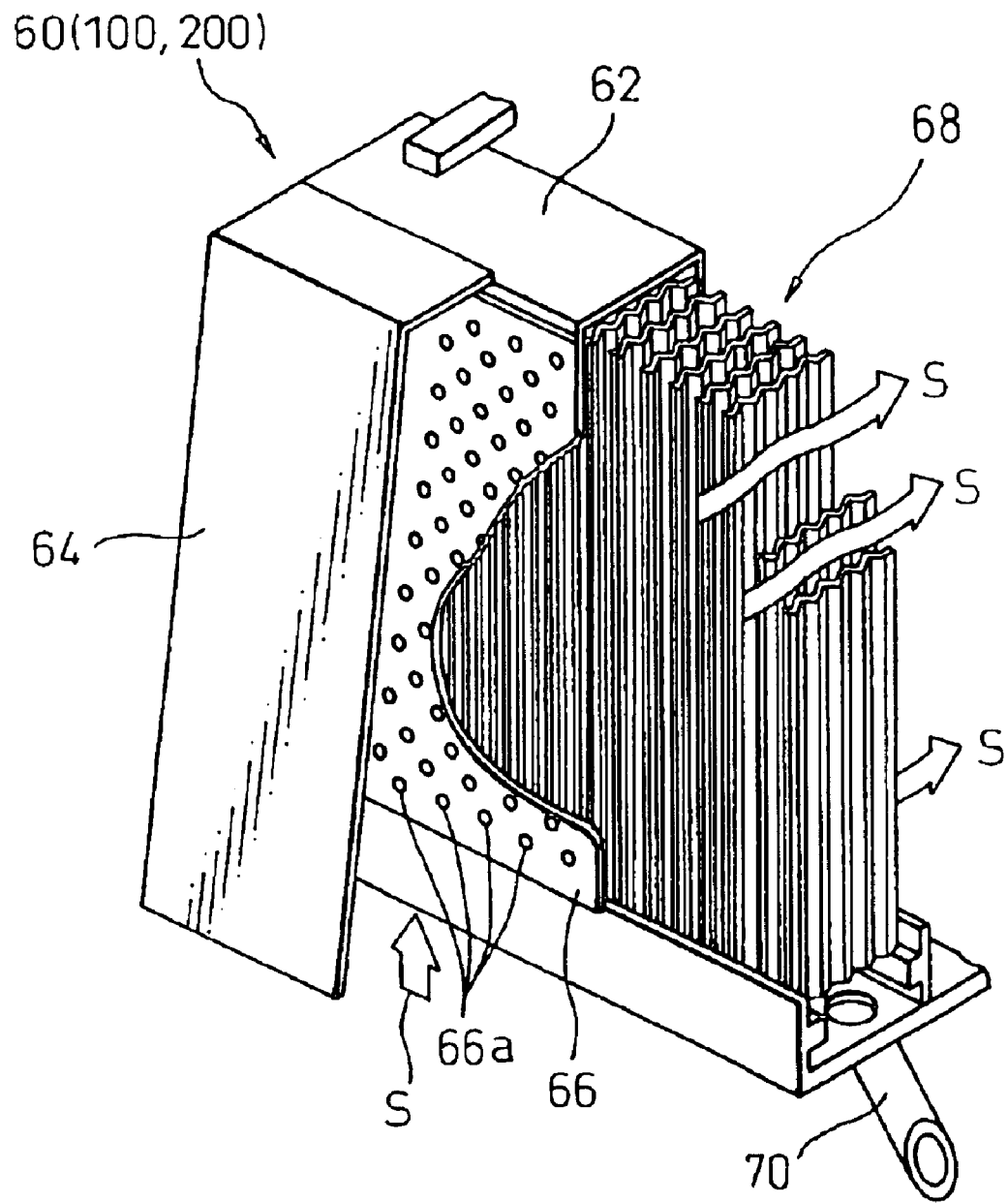
FIG. 4 is a schematic section of a steam generator for a pressurized water type nuclear power plant.
Figure 5:
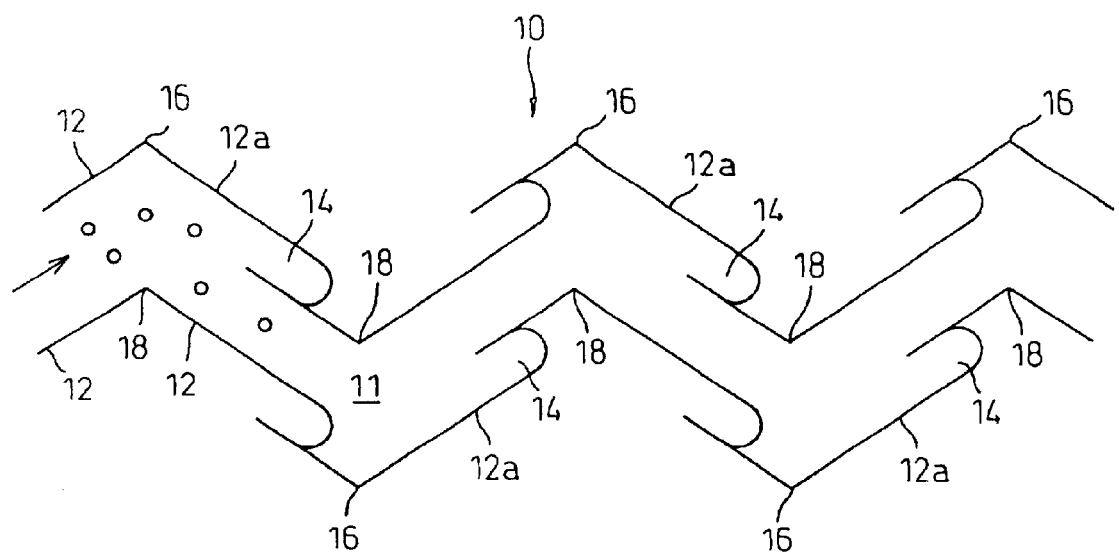
FIG. 5 is a diagram similar to FIG. 1 showing a moisture separator according to a prior art.

With reference to FIG. 4, a partial section of the moisture separator 60 to which the present invention is applied is shown. The moisture separator 60 (100–1500) has zigzag passages 68 of the invention disposed in a casing 62. The steam S, generated through the heat exchange with the primary cooling water as described above, flows from the lower side of a hood plate 64 through a plurality of apertures 66a, defined in a perforated panel 66, and the passages 68 and out of the opposite side. During the steam S flows through the passages 68, the droplets contained in the steam S are separated and returned through a drain pipe 70 to the lower part of the inside volume of the pressure vessel 52 where the secondary water is contained.

Figure 1:
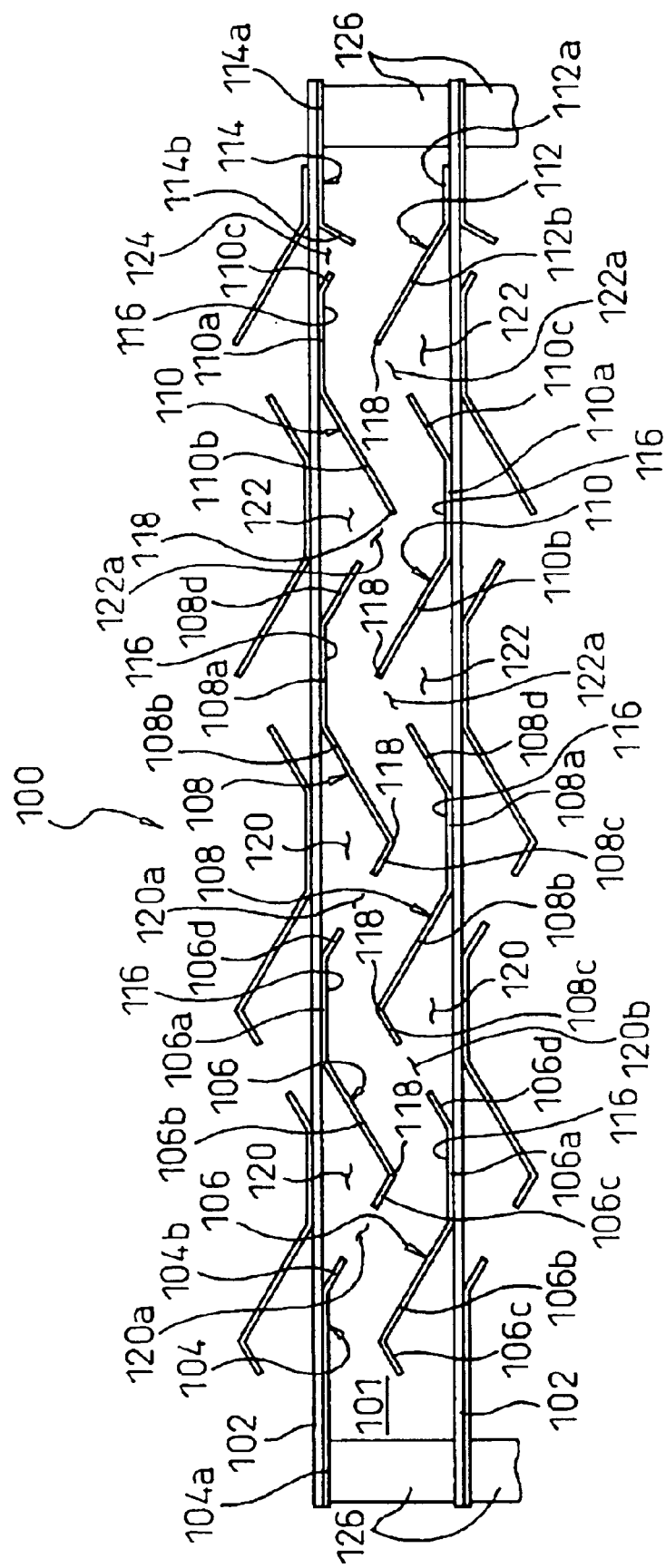
FIG. 1 is a diagram showing a single passage of a moisture separator according to a first embodiment of the invention.
Figure 2:
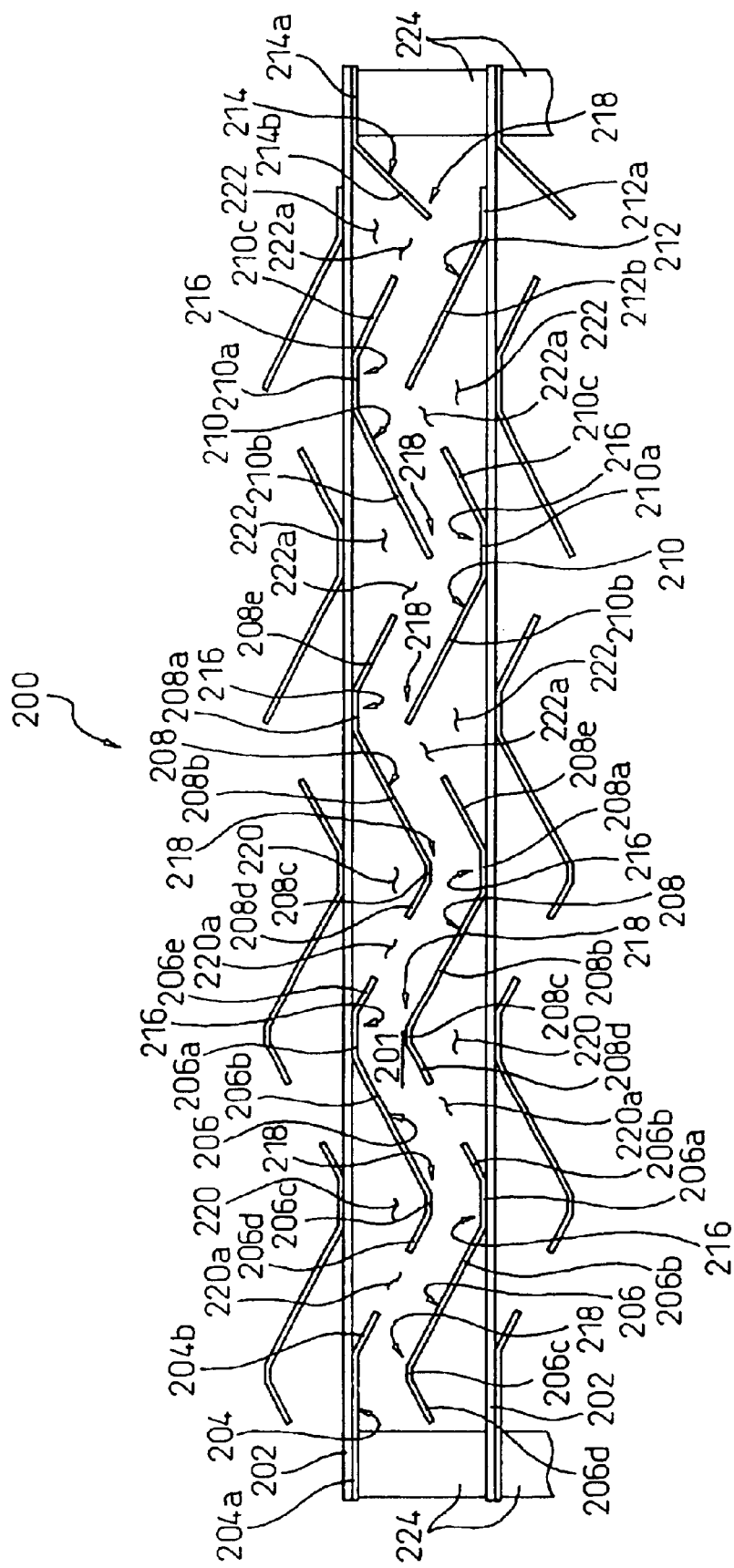
FIG. 2 is a diagram similar to FIG. 1 showing a second embodiment of the invention.

With reference to FIGS. 1 and 2, the passages 68 of the moisture separator 60 will be described in detail below. In this connection, the passages 68 are indicated by new reference numbers in the respective figures. Further, although only a single passage is shown in each of FIGS. 1 and 2, the moisture separator 60 includes a plurality of passages disposed side by side and defined by a plurality of frame plates, as shown in FIG. 4.

The moisture separator 100 according a first embodiment shown in FIG. 1 includes a plurality of frame plates 102 which are disposed parallel to and separated from each other by spacers 126. Between the frame plates 102, a plurality of zigzag passages 101 are defined. In particular, a plurality of vanes or blades 104, 106, 108, 110, 112 and 114 for defining the side walls of the passages 101 are attached to the frame plates 102. The vanes 104, 106, 108, 110, 112 and 114 form roots 116 which swell outwardly relative to the passage 101 and apexes 118 which swell inwardly relative to the passages 101. In this connection, in the embodiment of FIG. 1, the steam containing the droplets is supplied through the left end of each of the passages 101 and flows out of the moisture separator 100 through the right end. The terms "upstream", "downstream" and "flow direction" are referred hereinafter in relation to this steam flow through the passages 101.

The vane 104 is disposed at the most upstream region and has a body portion 104a defining a steam introducing section and a tail portion 104b extending toward the apex 118. Each of the vane 106 has a flat body portion 106a attached to the frame plate 102, a front portion 106b extending toward the apex 118 from the body portion 106a, a bending portion 106c bending outwardly relative to the passage 101 from the front portion 106b and a tail portion 106d extending toward the downstream apex 118 from the body portion 106a. Each of the vanes 108 has a body portion 108a, a front portion 108b, a bending portion 108c and a tail portion 108d. The vanes 108 are formed similar to the vanes 106, however, the tail portions 108d are longer that the tail portions 106d of the vanes 106. Each of the vanes 110 has a body portion 110a, a front portion 110b and a tail portion 110c, however, does not has a bending portion. Vanes 112 and 114 have flat body portions 112a and 114a, defining a steam discharge section, and front portions 112b and 114b extending to the upstream apexes 118. The body portions 104a, 106a, 108a, 110a, 112a and 114a are arranged parallel to the frame plate 102 and attached to the frame plate 102. This configuration enables the zigzag passages 101 to be defined between the frame plates 102 even though the frame plates 102 are flat.

The side walls, defined by the vanes 104, 106, 108, 110, 112 and 114, in particular the side wall portions extending from the roots 116 to the apexes 118, seen from the upstream side of the passage 101, define a plurality of openings 120a and 112a which provide entrances of droplet collecting pockets 120 and 122. In this embodiment, the droplet collecting pockets include first droplet collecting pockets 120 for collecting relatively large droplets and second droplet collecting pockets 122, disposed in the passage 101 downstream of the first droplet collecting pockets 120, for collecting relatively small droplets.

In this embodiment, the entrance openings 120a of the first droplet collecting pockets 120 are arranged between the tail portion 104b of the vane 104 and the bending portion 106c of one of the vanes 106 and between the tail portions 106d and the bending portions 108c of the vanes 108. On the other hand, the entrance openings 122a of the second droplet collecting pockets 122 are arranged between the tail portions 108d of the vanes 108 and front portions 110a of the vanes 110 and between the tail portions 110c of the vanes 110 and the front portions 112a and 114a of the vanes 112 and 114.

As shown in FIG. 1, the entrance openings 120a of the first droplet collecting pockets 120 are disposed apart from the apexes 118 toward the roots 116 by a distance corresponding to the length of the bending portions 106c and 108c of the vanes 106 and 108. On the other hand, the entrance openings 112a of the second droplet collecting pockets 122 are disposed to adjoin the apexes 118 because the vanes 110, 112 and 114 do not have portions extending from the apexes 118 toward the upstream side roots 116.

The operations and functions of this embodiment will be described below.

The steam containing the droplets flows into the passages 101 through the left ends of the passages in FIG. 1. When the steam flows through the zigzag passages 101, the droplets contained in the steam impinge against the side walls of the passages 101. At that time, a portion of the droplets enters into the first droplet collecting pockets 120 and 122 to be trapped in the pocket 120 and 122. The droplets trapped in the pockets 120 and 122 are collected into a drain recovery unit (not shown) and mixed into the secondary cooling water contained in the steam generator.

In the upstream side of the passage 101, most of the relatively large droplets are trapped. Therefore, the droplet collecting pockets are saturated with water, and so called carry over easily occurs to allow droplets fly again into the steam flow in the passage 101. In particular, stagnation flows are generated adjacent the roots 116 so that the main stream in the passages 101 passes over the stagnation flows. Therefore, the trapped water is often lodged unevenly at the downstream side from the apexes 118 within the inside volume of the first droplet collecting pockets 120. Therefore, the bending portions 106c and 108c of the vanes 106 and 108 are provided at the entrance openings 120a of the first droplet collecting pockets 120, which are disposed at the upstream side portions of the passages 101, to reduce the unevenly lodged water and to prevent the carry over. Further, the entrance openings 120a of the first droplet collecting pockets 120 are advantageously disposed near the apexes 118 apart from the stagnation flows.

On the other hand, at the downstream side portions of the passages 101, a large number of relatively small droplets are contained in the steam flow. The smaller the droplets, the more likely they ride on the steam flow and do not impinge against the side walls. Therefore, the entrance openings 122a of the second droplet collecting pockets 122 are adjoining the apexes 118, where the flow rate is high and the flow direction is suddenly changed, to promote the collection of the small droplets.

With reference to FIG. 2, a second embodiment of the invention will be described below.

The moisture separator 200 according a second embodiment shown in FIG. 2 includes a plurality of frame plates 202 which are disposed parallel to and separated from each other by spacers 224. Between the frame plates 202, a plurality of zigzag passages 201 are defined. In particular, a plurality of vanes or blades 204, 206, 208, 210, 212 and 214 for defining the side walls of the passages 201 are attached to the frame plates 202. The vanes 204, 206, 208, 210, 212 and 214 form roots 216 which swell outwardly relative to the passage 201 and apexes 218 which swell inwardly relative to the passages 201. In this connection, in the embodiment of FIG. 2, the steam containing the droplets is also supplied through the left end of each of the passages 201 and flows out of the moisture separator 200 through the right end. The terms "upstream" "downstream" and "flow direction" are referred hereinafter in relation to this steam flow through the passages 201.

The vane 204 is disposed at the most upstream region and has a body portion 204a defining a steam introducing section and a tail portion 204b extending toward the apex 218. Each of the vane 206 has a flat body portion 206a attached to the frame plate 202, a front portion 206b extending toward the apex 218 from the body portion 206a, an intermediate portion 206c extending parallel to the frame plate 202 from the front portion 206b, a bending portion 206d bending outwardly relative to the passage 201 from the intermediate portion 206c and a tail portion 206e extending toward the downstream apex 218 from the body portion 206a. Each of the vanes 208 has a body portion 208a, a front portion 208b, an intermediate portion 208c, a bending portion 208d and a tail portion 208e. The vanes 208 are formed similar to the vanes 206, however, the tail portions 208e are longer that the tail portions 206d of the vanes 206. Each of the vanes 210 has a body portion 210a, a front portion 210b and a tail portion 210c, however, does not has an intermediate portion and a bending portion. Vanes 212 and 214 have flat body portions 212a and 214a, defining a steam discharge section, and front portions 212b and 214b extending to the upstream apexes 218. The body portions 204a, 206a, 208a, 210a, 212a and 214a are arranged parallel to the frame plate 202 and attached to the frame plate 202. This configuration enables the zigzag passages 201 to be defined between the frame plates 202 even though the frame plates 202 are flat.

The side walls, defined by the vanes 204, 206, 208, 220, 212 and 214, in particular the side wall portions extending from the roots 216 to the apexes 218, seen from the upstream side of the passage 201, define a plurality of openings 220a and 222a which provide entrances of droplet collecting pockets 220 and 222. In this embodiment, the droplet collecting pockets include first droplet collecting pockets 220 for collecting relatively large droplets and second droplet collecting pockets 222, disposed in the passage 201 downstream of the first droplet collecting pockets 220, for collecting relatively small droplets.

In this embodiment, the entrance openings 220a of the first droplet collecting pockets 220 are arranged between the tail portion 204b of the vane 204 and the bending portion 206d of one of the vanes 206 and between the tail portions 206e and the bending portions 208d of the vanes 208. On the other hand, the entrance openings 222a of the second droplet collecting pockets 222 are arranged between the tail portions 208e of the vanes 208 and front portions 210a of the vanes 210 and the tail portions 210c of the vanes 210 and the front portions 212a and 214a of the vanes 212 and 214.

As described above, the second embodiment is substantially identical to the first embodiment, except for that the vanes 206 and 208 have intermediate portions 206c and 208c. Therefore, the operation and effect of the second embodiment is substantially identical to those of the first embodiment. However, according to the second embodiment, the provision of the intermediate portions 206c and 208c reduces the pressure loss of the steam through the passages 201.

Further, in the above-described embodiments, the vanes have sectional configurations composed of lines connected to each other. However, the vanes may have sectional configurations composed of arcuate sections connected to each other.

Further, a droplet collecting member, for example a coil member or a perforating plate for promoting the agglomeration of the droplets, may be disposed between the first and second droplet collecting pockets.

What is claimed is:

1. A moisture separator with a plurality of frame plates disposed parallel to each other to define a plurality of zigzag passages, wherein the frame plates comprise flat plate members;

the moisture separator comprising droplet collecting pockets having entrance openings disposed in side wall portions of the zigzag passages between, seeing from the upstream side of the passages, roots swelling outwardly relative to the passage and apexes swelling inwardly relative to the passage; and the droplet collecting pocket including first droplet collecting pockets, disposed at the upstream side of the passages, for collecting relatively large droplets, and second droplet collecting pockets, disposed at the downstream side of the passages, for collecting relatively small droplets.

2. A moisture separator according to claim 1, wherein the entrance openings of the first droplet collecting pockets are disposed apart from the apexes in the side wall portions between the roots swelling outwardly relative to the passage and the apexes swelling inwardly relative to the passage, and the entrance openings of the second droplet collecting pockets are disposed adjacent the apexes in the side wall portions between the roots swelling outwardly relative to the passage and the apexes swelling inwardly relative to the passage.

3. A moisture separator according to claim 2 further comprising means, disposed between the first and second droplet collecting pockets, for agglomerating droplets.

4. A moisture separator according to claim 3, wherein the means for agglomerating droplets comprises a coil member disposed to across the passage.

5. A moisture separator according to claim 1 further comprising means, disposed between the first and second droplet collecting pockets, for agglomerating droplets.

6. A moisture separator according to claim 5, wherein the means for agglomerating droplets comprises a coil member disposed to across the passage.

7. A steam generator comprising a moisture separator according to claim 1, an inversed U-shaped tube bundle which uses the primary cooling water from a nuclear reactor as a heating medium and a plurality of steam separators.

8. A moisture separator with a plurality of frame plates disposed parallel to each other to define a plurality of zigzag passages, wherein the frame plates comprise flat plate members;

the moisture separator comprising a plurality of droplet collecting pockets having entrance openings disposed in side wall portions of the zigzag passages between, seeing from the upstream side of the passages, roots swelling outwardly relative to the passage and apexes swelling inwardly relative to the passage; and the entrance openings of all the droplet collecting pocket being disposed adjacent the apexes in the side wall portions between the roots swelling outwardly relative to the passage and the apexes swelling inwardly relative to the passage.

9. A moisture separator according to claim 8, wherein the zigzag passages are defined by a plurality of vanes secured to the frame plates, the most upstream vanes of the plurality of vanes have projections extending along the central axis in the upstream direction relative to the steam flow, through the passages toward a steam introducing section.

10. A moisture separator with a plurality of frame plates disposed parallel to each other and a plurality of arcuate sections attached to the frame plates to define a plurality of serpentine passages, wherein the frame plates comprise flat plate members;

the moisture separator comprising a plurality of droplet collecting pockets having entrance openings disposed in side wall portions of the serpentine passages between, seeing from the upstream side of the passages, roots swelling outwardly relative to the passage and apexes swelling inwardly relative to the passage.

11. A moisture separator according to claim 10, wherein the serpentine passages are defined by a plurality of vanes secured to the frame plates, the plurality of vanes including arcuately curved portions disposed at least the either end thereof.

* * * * *